(12) United States Patent
Yustick (10) Patent No.: US 6,205,638 B1
(45) Date of Patent: Mar. 27, 2001

(54) END MODULE ASSEMBLY FOR INSTALLATION ON A VEHICLE AND METHOD FOR MAKING THE SAME

(75) Inventor: Robert F. Yustick, West Blommfield, MI (US)

(73) Assignee: Decoma International Inc., Ontario (CA)

(*) Notice: Subject to any disclaimer, the term of this patent is extended or adjusted under 35 U.S.C. 154(b) by 0 days.

(21) Appl. No.: 09/177,531

(22) Filed: Oct. 23, 1998

Related U.S. Application Data (60) Provisional application No. 60/062,817, filed on Oct. 24, 1997.

(51) Int. Cl.$^7$ .............................. B25B 27/14; B25B 27/16
(52) U.S. Cl. ............................... 29/464; 29/469; 29/281.5
(58) Field of Search ........................ 29/464, 469, 281.5

(56) References Cited

U.S. PATENT DOCUMENTS

| | | |
|---|---|---|
| 2,395,411 | 2/1946 | Kittel . |
| 2,955,870 | 10/1960 | Richards . |
| 3,596,978 | 8/1971 | Wessells et al. . |
| 4,406,489 | 9/1983 | Trabert . |
| 4,428,447 | 1/1984 | Malen . |
| 4,542,934 | 9/1985 | Komatsu et al. . |
| 4,566,407 | 1/1986 | Peter . |
| 4,597,461 | 7/1986 | Kochy et al. . |
| 4,597,603 | 7/1986 | Trabert . |
| 4,825,342 * | 4/1989 | Gorski ..................................... 362/61 |
| 4,875,273 * | 10/1989 | Yamamoto ............................. 29/464 |
| 4,940,281 | 7/1990 | Komatsu . |
| 4,964,672 | 10/1990 | Fujii . |
| 4,978,164 | 12/1990 | Nakamura et al. . |
| 4,979,584 | 12/1990 | Charles . |
| 5,077,885 * | 1/1992 | Kanemitsu et al. .................... 29/469 |
| 5,106,148 | 4/1992 | Okeda et al. . |
| 5,271,473 | 12/1993 | Ikeda et al. . |
| 5,301,411 | 4/1994 | Fujiwara et al. . |
| 5,476,138 | 12/1995 | Iwasaki et al. . |
| 5,533,780 | 7/1996 | Larson et al. . |
| 5,658,041 | 8/1997 | Girardot et al. . |
| 5,787,646 * | 8/1998 | Nakamori .............................. 29/464 |

FOREIGN PATENT DOCUMENTS

| | | |
|---|---|---|
| 32 47 989 | 6/1984 | (DE) . |
| 35 44 124 | 7/1987 | (DE) . |
| 196 12 479 | 12/1997 | (DE) . |
| 0 178 266 | 4/1986 | (EP) . |
| 0 274 993 | 7/1988 | (EP) . |
| 0 519 776 | 12/1992 | (EP) . |
| 2 081 930 | 2/1982 | (GB) . |
| 59-11976 | 1/1984 | (JP) . |
| 59-186780 | 10/1984 | (JP) . |
| 63-103771 | 5/1988 | (JP) . |
| 63-103773 | 5/1988 | (JP) . |
| 63-110075 | 5/1988 | (JP) . |

(List continued on next page.)

*Primary Examiner*—I Cuda Rosenbaum
*Assistant Examiner*—Eric Compton
(74) *Attorney, Agent, or Firm*—Pillsbury Madison & Sutro LLP (57) ABSTRACT

The present invention relates to an end module assembly for installation on a motor vehicle and a method for assembling the same. The assembly comprises an exterior fascia configured to comprise a portion of a vehicle body when the assembly is installed on the vehicle. An external visible component is configured to be positioned in a predetermined orientation with respect to the fascia with surfaces thereof facing exteriorly of the fascia. The external component is positioned relative to the fascia such that the position controlling portion guides the external component into the predetermined orientation and supports the component thereat, thereby allowing the assembly to be installed on the vehicle without requiring reorientation of the component. The present invention also relates to a loading fixture for installing a front end module assembly onto a motor vehicle.

16 Claims, 9 Drawing Sheets

FOREIGN PATENT DOCUMENTS

| | | |
|---|---|---|
| 63-212184 | 9/1988 | (JP) . |
| 63-227479 | 9/1988 | (JP) . |
| 3-208778 | 9/1991 | (JP) . |
| 3-284481 | 12/1991 | (JP) . |
| 4-63774 | 2/1992 | (JP) . |
| 8-258745 * | 10/1996 | (JP) . |

* cited by examiner

END MODULE ASSEMBLY FOR INSTALLATION ON A VEHICLE AND METHOD FOR MAKING THE SAME

This application claims the benefit of Provisional No. 60/062,817 filed Oct. 24, 1997.

The present invention relates to an end module assembly for installation on either a front or rear end of a vehicle and a method for making the same.

In the typical method of assembling a motor vehicle, the vehicle is moved down an assembly line and components are individually fastened to the vehicle. In the front end of the vehicle, a radiator support structure is fastened to the vehicle body. Each of the components associated with the vehicle front end are then fastened individually to the support structure. In particular, external components, such as head lamps, fog lamps, and the grill, and the front end fascia are fastened to the support structure individually. Fastening components in such a manner oftentimes causes the external components and the exterior fascia to be misaligned with respect to one another due to the potential error margins associated with mounting each part individually. The sum of these error margins can cause component misalignment and poor vehicle aesthetics. To achieve proper component alignment, each external component must not only be aligned properly with respect to the fascia, but also with every other external component. Correcting these errors consumes time, increases labor costs, and decreases overall manufacturing efficiency.

U.S. Pat. Nos. 5,123,695 and 5,358,304 disclose assemblies in which the front end fascia and the external visible components associated with the front end are pre-assembled to each other and optionally to an integrating structure or carrier panel. This arrangement allows the entire assembly to be mounted directly on the vehicle. The assembly disclosed in these patents, however, does not obviate the problems associated with the method described above because the fascia and the external visible components are still being mounted individually and then the assembly is mounted to the vehicle. Due to the individual mounting of the fixtures, the same component misalignment problems will occur.

It is therefore an object of the present invention to provide an end module assembly with superior component alignment between the fascia and external components, thereby obviating the need for reorienting the components after installation or accepting any misalignment because there are no adjustment provisions. In order to achieve the object of the present invention, there is provided an end module assembly for installation on a motor vehicle. The assembly comprises an exterior fascia configured to comprise a portion of a vehicle body when the assembly is subsequently installed on the vehicle. An external visible component is configured to be positioned in a predetermined orientation with respect to the fascia with surfaces of the component facing exteriorly of the fascia. The fascia has a position controlling portion. The external visible component is positioned relative to the fascia such that the portion guides the external component into the predetermined orientation and supports the component thereat, thereby allowing the assembly to be installed on the motor vehicle without requiring reorientation of the component.

According to another aspect of the present invention, there is provided a method for assembling an end module assembly for installation on a motor vehicle. The method comprises providing an exterior fascia configured to comprise a portion of the vehicle body when the assembly is subsequently installed on the motor vehicle. An external visible component is configured to be positioned in a predetermined orientation with respect to the fascia with surfaces thereof facing exteriorly of the fascia. Both the external component and the fascia are positioned in an external assembling fixture. The assembling fixture provides fixed surfaces positioned and configured to engage the exteriorly facing surfaces of the external visible component and exteriorly facing surfaces of the fascia so as to support the fascia in the predetermined orientation with respect to the fascia. The external component and the fascia are thereafter secured in fixed relation while in the assembling fixture so as to fix the component in the predetermined orientation thereof, thereby allowing the assembly to be installed on the vehicle without requiring reorientation of the external visible component.

According to yet another aspect of the present invention, there is provided another method for assembling an end module assembly for installation on a motor vehicle. The method comprises providing an exterior fascia configured to comprise a portion of a vehicle body when the assembly is subsequently installed on the motor vehicle. An external visible component is configured to be positioned in a predetermined orientation with respect to the fascia with surfaces of the external visible component facing exteriorly of the fascia. The component and the fascia are positioned relative to one another such that position controlling portions of the fascia guide the component into the predetermined orientation with respect to the fascia and support the fixture thereat, thereby allowing the module assembly to be subsequently installed on the motor vehicle without requiring reorientation of the component.

An end module assembly constructed in accordance with the principles of the present invention provides superior component alignment in comparison to assembling in which the component and the fascia are mounted individually to an integrating structure. Specifically, the present invention provides optimal part-to-part fit and accurately positions all end module components. The components may include, but are not limited to, lamps, the grill, and decorative trim. It should be appreciated that the principles of the present invention may also be applied to rear end module assemblies as well as front end module assemblies.

Another aspect of the present invention relates to a loading fixture for installing a front end module assembly onto a motor vehicle having a body and a frame movable relative to one another. The module assembly comprises an exterior fascia, external components, and bumper beam supporting structure loosely supporting the bumper beam. The fixture comprises a first lifting fixture constructed and arranged to engage the module assembly so as to lift and subsequently move the module assembly into a module installation position wherein the module assembly can be installed on the vehicle with the fascia comprising a portion of the vehicle body. A second lifting fixture is constructed and arranged to engage and lift the bumper beam relative to the bumper beam supporting structure such that, when the first lifting fixture subsequently moves the module assembly into the installation position thereof, the second lifting fixture supports the bumper beam in a bumper beam installation position for subsequent attachment to the vehicle frame.

Other objects, features, and advantages will become apparent from the following detailed description, the accompanying drawings, and the appended claims.

DETAILED DESCRIPTION OF THE DRAWINGS

Figure 1:
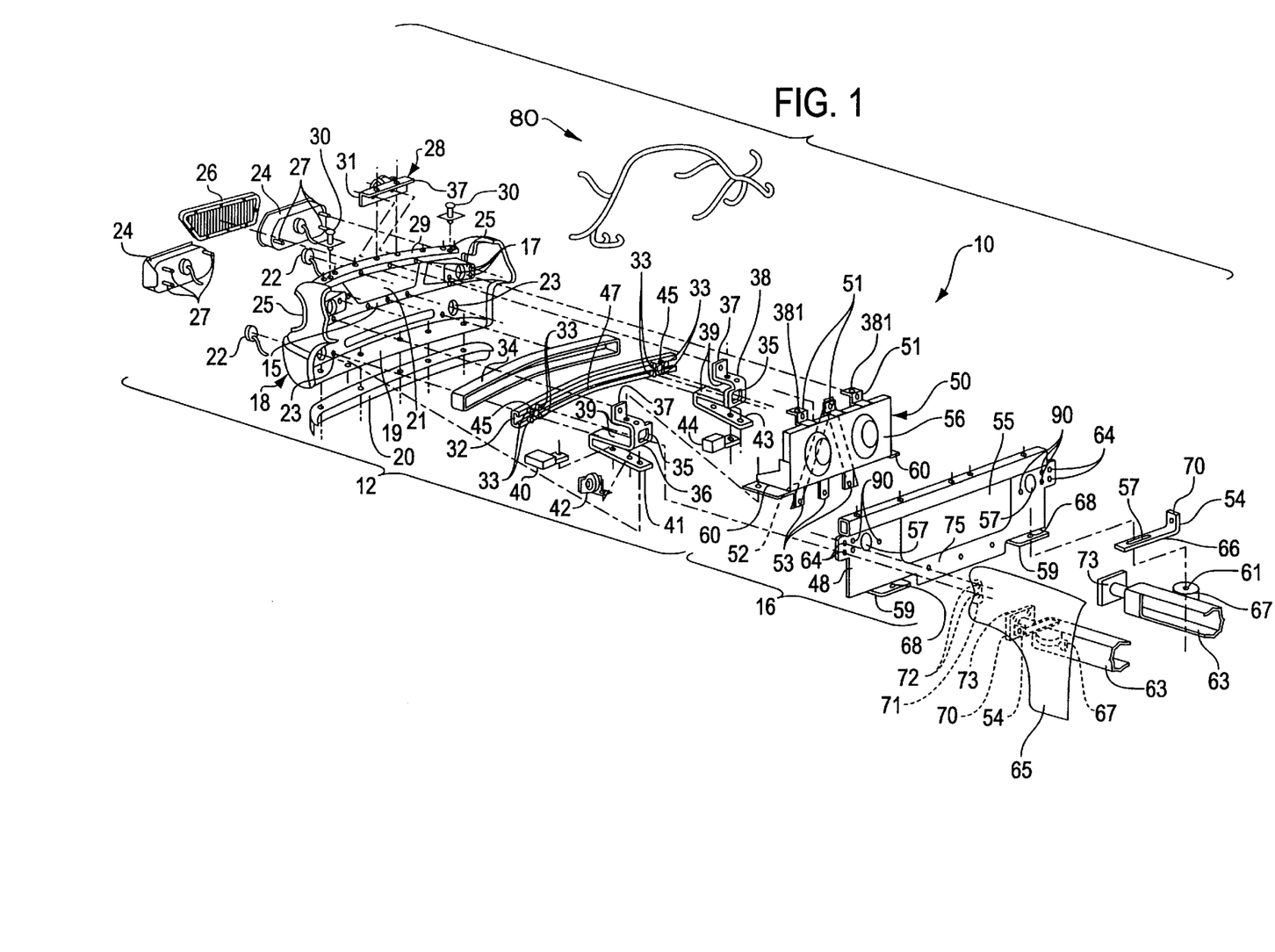
FIG. 1 is an exploded view of a front end module assembly for a framed vehicle with integral radiator support structure in accordance with a first embodiment of the present invention.
Figure 2:
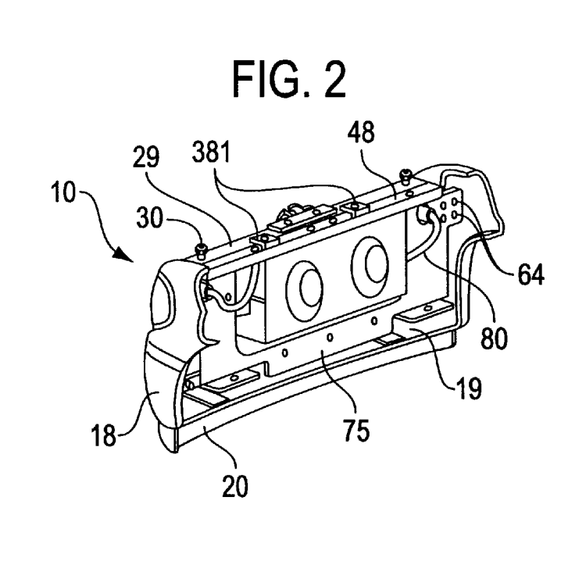
FIG. 2 is a perspective view of the embodiment shown in FIG. 1.

FIGS. 1 and 2 show a front end module assembly, generally indicated at 10, for a framed motor vehicle constructed in accordance with the principles of the present invention. For simplicity of explanation, the module assembly 10 may be considered to comprise two groups of parts: a forward group, or fascia sub-module, generally illustrated at 12; and a rear group, or cooling sub-module, generally illustrated at 16.

The forward group 12, includes a molded plastic fascia, generally depicted at 18. Typically, the fascia 18 is relatively flexible without a great deal of structural rigidity. The forward group 12 includes a number of external visible components and other front end-associated parts that are secured to the assembly 10 by conventional fasteners in fixed relation with respect to the fascia 18. The external components comprise components which are to be positioned in a predetermined orientation with respect to the fascia 18 with surfaces thereof facing exteriorly of the fascia 18. These external components include, but are not limited to, an air dam 20, fog lamps 22, head lamps 24, and a grill 26.

The air dam 20 is fixed to the bottom of the fascia 18, extending approximately the length of the fascia 18 in the cross-car direction. A pair of auxiliary or fog lamps 22 are mounted in fog lamp receiving openings defined by holes 23 disposed in laterally spaced relation in the front of the fascia 18. The head lamps 24 are laterally spaced and mounted in head lamp receiving openings defined by fascia panel recesses 25 molded near the lateral or cross-car ends of the fascia 18 above the holes 23 for fog lamps 22. The fog lamps 22 form a snap-fit connection with holes 23. The recesses 25 have a plurality of holes 17 for receiving various bolts and wiring components 27 that enable the headlamps 24 to be loosely secured in proper centered position relative to the recesses 25 in the fascia 18.

A pair of hood bumpers 30 are disposed near the opposite ends of the upper surface of an upper elongate horizontal portion 29 of the fascia 18. A hood latch assembly 28 is fixed to the forward surface of the upper horizontal portion 29 towards the center of the fascia 18. More particularly, latch assembly 28 has a downwardly depending flange 31 which is fastened via bolts to the forward face of horizontal portion 29. The latch assembly 28 further includes an upper flange portion 37 extending rearwardly from flange portion 31 and disposed at right angles to flange portion 31. The flange portion 37 is fixed by appropriate fasteners to an upwardly facing surface of horizontal portion 29. The grill 26 is fixed to the fascia 18 by appropriate fasteners at a horizontally extending opening 21 disposed at the upper middle area of the front of the fascia 18.

A steel bumper beam 32 having a "C"-shaped cross section defining opening 47 is disposed across the width of the module assembly 10. An elongated foam block 34 is hollowed out at its rear side and receives in fixed relation the forward, lower, and upper portions of the bumper beam 32 with the opening 47 of the C-section facing rearwardly. The rearwardly facing surfaces of the bumper beam 32 above and below the C-opening are provided with a plurality of fasteners in the form of nuts 33 at the opposite end portions of the bumper beam 32. The nuts 33 are preferably welded to the bumper beam. The rearward facing surface of bumper beam 32 also has a pair of laterally spaced hook shaped beam catches 45 which are used in mounting the bumper beam 32 on a vehicle frame as will be described. A pair of bumper beam supporting structures in the form of fascia support brackets 36, 38 are secured to the back of the fascia 18. Base portions 41, 43 of the respective fascia support bracket 36, 38 are secured in fixed relation with an inside base 19 of the fascia 18 by appropriate fasteners. Fasteners are also used to fix tabs 37 rising from each of a pair of upper legs 39 of fascia support brackets 36, 38 to the rear surface of a middle horizontal portion 15 of the fascia 18.

The brackets 36, 38 loosely capture the bumper beam 32 within leg portions 39 so as to position the bumper beam 32 within the lower cavity formed above the inside base 19 of the fascia 18. A temperature sensor 40 and a horn assembly 42 are secured to the base or bottom leg 41 of one of the fascia support brackets 36, while an air bag sensor 44 is secured to the base 43 of the other fascia support bracket 38. Support brackets 36,38 each have a large aperture 35 which can receive therethrough a plurality of bolts that can be used to secured the bumper beam 32 (via nuts 33) to the vehicle frame front rail brackets 73 after the module assembly 10 is secured to the front end of the vehicle as will be described.

The bumper beam 32 is not connected to or supported by any other components within the module assembly 10, as it must eventually be connected during final assembly with front rail brackets 73 of the vehicle frame. Conventional framed vehicle system dynamics allow relative movement between the chassis system (such as the vehicle frame, bumper beam, etc.) and the body system (fascia, body panels, etc) during vehicle operation. Thus, the bumper beam 32 merely rests between legs 39 of the brackets 36 and 38 when the module is shipped for vehicle assembly. After assembly to the vehicle, the bumper beam 32 is fixed to front rail brackets 73 in spaced relation to the fascia 18 to permit slight movement between fascia 18 and beam 32 during vehicle operation. The beam 32, when fixed to brackets 73 in the assembled vehicle is hidden by the fascia 18.

The rear group 16 includes a component integrating structure in the form of a radiator support structure 48, generally extending the full width of the module assembly 10. The rear group 16 further comprises a cooling module 50, including but not limited to a radiator, condenser, transmission oil cooler, and fan shroud 56. A plurality (preferably three) of upwardly extending tabs 51 are fixed to and extend upwardly from an upper portion of cooling module 50. The outer two tabs 51 have forwardly extending portions provided with holes 381 which are used for lifting the module assembly 10 during installation on the front end of a vehicle.

A plurality (preferably three) of downwardly extending tabs are fixed to and extend downwardly from a lower portion of cooling module 50. A radiator center support "V" bracket 52 is fixed on the forward face of the cooling module 50 at a central upper tab 51 and two of the lower outer tabs 53. The cooling module 50 has laterally outwardly extending fascia mounting brackets 60 which are supported and mounted to the uppermost surface of the upper legs 39 of the associated fascia support brackets 36 and 38.

The radiator support structure 48 has an opening 55 through which the cooling module 50 extends rearwardly. The radiator support structure 48 further includes a lower wall 75 beneath opening 55 and to which fasteners secure tabs 53 of the cooling module 50. A pair of tabs 59 are appended to the lower edge of the radiator support 48, and are disposed slightly inwardly to the lateral ends of the support 48. The tabs 59 attach to radiator support frame mounts 67, which are fixed to the vehicle frame 63, through holes 61. Fender mounting brackets 54 each have elongated openings 57 disposed in an elongated leg portion 66 of the mounts 54. The elongated leg portions 66 are sandwiched between the tabs 59 of radiator support structure 48 and resilient isolator mounting structures 67 of the vehicle frame 63. Fasteners pass through openings 68 in the tabs 59, through the elongated openings 57 in the fender mounting brackets 54, and through holes 61 in the isolator mounting structures 67. As a result, the radiator support structure 48 can be fixed to the vehicle frame 63, with isolator mounts 67 providing for slight relative movement between the module 10 and frame 63. Each fender mounting bracket 54 further includes a truncated leg 70 disposed at a right angle to elongated leg 66. Truncated legs 70 facilitate securement of fenders 65 to the vehicle frame 63. Each fender 65 is provided with a mounting tab 71 which has openings 72 that can be used to fasten the fenders 65 to opposite sides of the radiator support structure 48 at holes 64.

As shown, radiator support structure 48 also includes a plurality of holes 90 that receive the bolts 27 of headlamps 24 to rigidly fix the headlamps to the radiator support structure 48 and in proper centered orientation to recesses 25. Radiator support structure 48 also has holes 57 for receiving wiring from a wiring harness 80 that provides power to headlamps 24. The wiring harness 80 also provides power to other electrical components of the front end module 10, such as fog lamps 22. Fixed to the front end of vehicle frame 63 are the previously described pair of front frame brackets 73. During assembly, bumper beam 32 is connected to front frame brackets 73 via appropriate bolts being fastened through nuts 33 on the bumper beam 32.

It should be appreciated that the frame 63, fender 65, front frame brackets 73 do not form part of module 10, but are particularly constructed and arranged to accommodate assembly of module 10 as a unit thereon.

To ensure proper orientation between the external components and the fascia 18 prior to installation of the vehicle, it is important to properly orient the components during the assembly with respect to one fixed reference point or template. Disclosed hereinbelow are two methods which will achieve such proper orientation.

Figure 9:
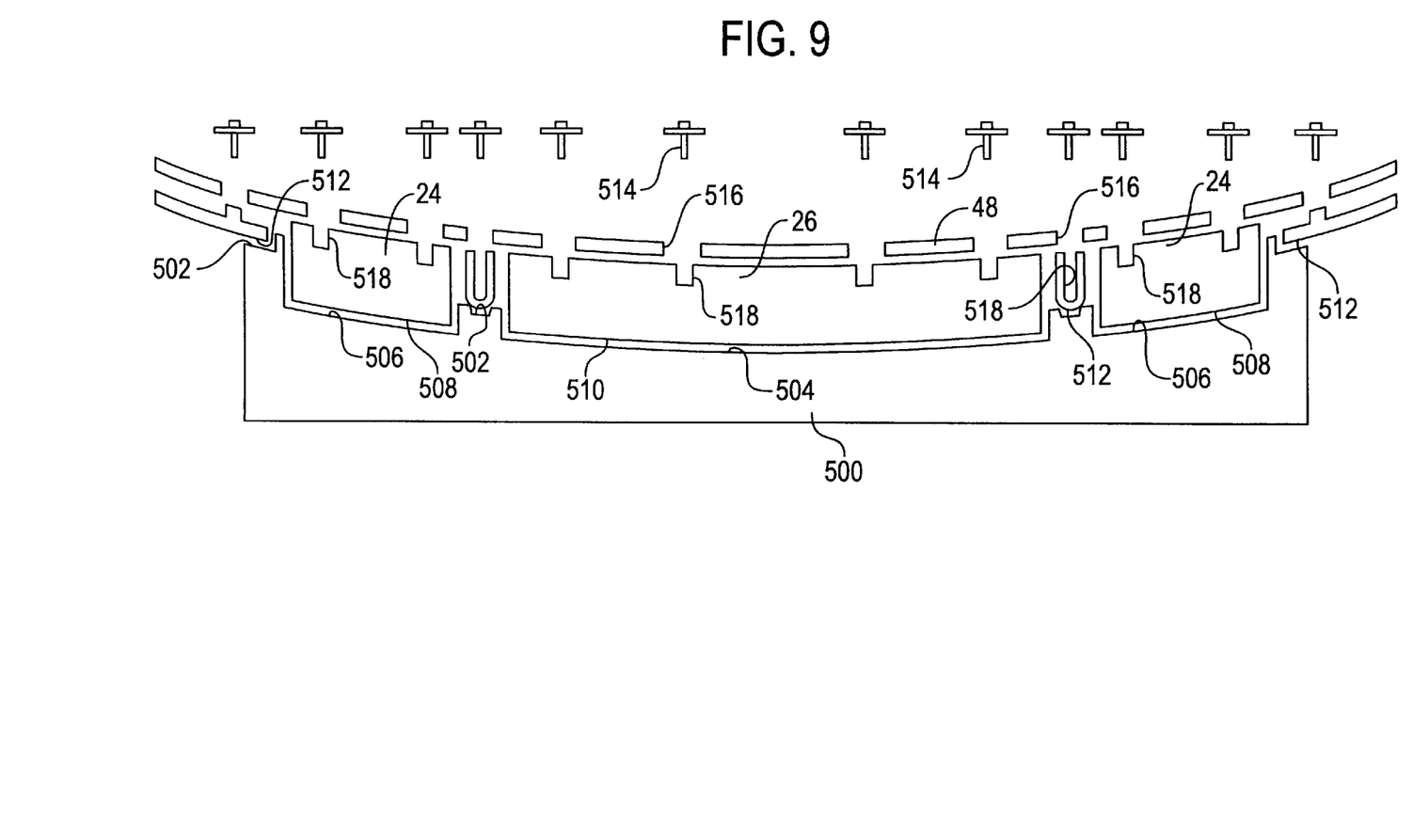
FIG. 9 is a cross-sectional view taken through a front end module assembly and an external assembly fixture wherein the assembly fixture orients the external components and the fascia relative to one another.
Figure 10:
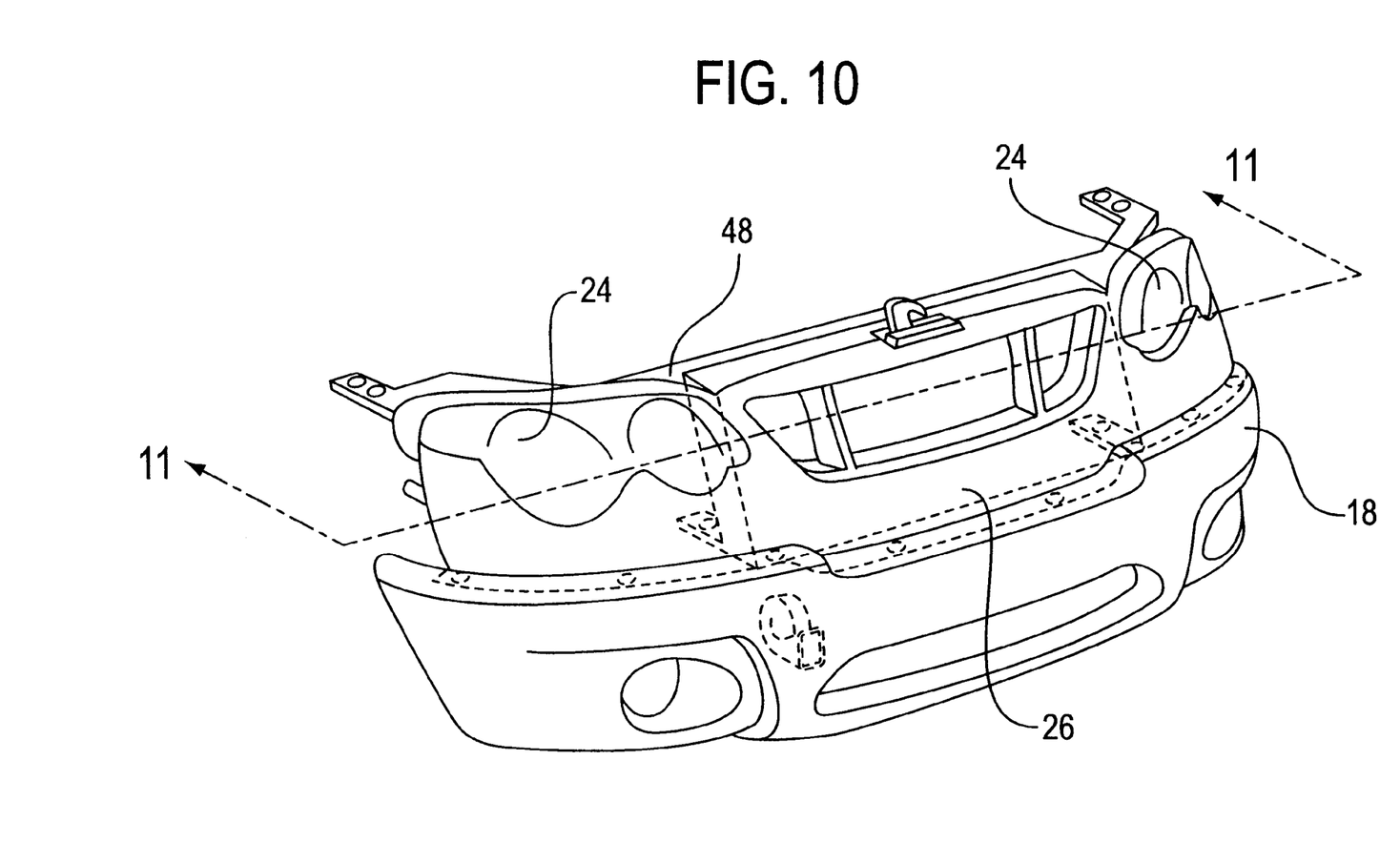
FIG. 10 is a perspective view of a front end module assembly taken from the front.

In one method of the present invention, an external assembling fixture, generally indicated at 500 in FIG. 9, functions as the template. The assembling fixture 500 provides fixed surfaces including fascia supporting surfaces 502, grill supporting surfaces 504, and head lamp supporting surfaces 506. These fixed surfaces 502, 504, 506 are positioned and configured to engage exteriorly facing surfaces 508, 510 of the external visible components (i.e., the head lamps 24 and grill 26) and exteriorly facing surfaces 512 of the fascia 18 so as to support the external components in their predetermined orientations with respect to the fascia 18. Thus, the surfaces of the assembling fixture 500 control the relative positioning between the fascia 18 and the external components, thereby eliminating the margins of error associated with positioning each component individually.

The assembling fixture 500 is a large metal mold having an upwardly facing concave recess providing the aforesaid fixed surfaces. When the fascia 18 and external components are positioned in the mold, the fixed surfaces support the fascia 18 and components in place. It is contemplated, however, that any fixture having surfaces capable of supporting the fascia 18 and external components in proper relative orientation may be used as the assembling fixture 500.

While the fascia 18 and external components are positioned in the of mold, the assembly integrating structure (i.e., radiator support structure 48) is positioned rearwardly of the components and fascia 18. The components and fascia 18 are thereafter mounted to the radiator support structure 48 so as to fix the external components in the predetermined orientation with respect to the fascia, thereby allowing the assembly to be installed on the vehicle without requiring reorientation of the components.

FIG. 9 also shows the step of inserting fasteners in the form of bolts 514 through openings 516 formed in the support structure 48. These bolts 514 are threadingly engaged with openings 518 formed in the fascia 18 and the components to fix the same in place. It is to be understood, however, that the same inserting and fastening step could be performed by bolts previously secured to the components and fascia 18 being received in the same openings 518 as the support structure is being moved into position.

With the fascia 18 and external components fixed in place, the assembly 10 can then be removed from the assembling fixture 500 without any relative movement occurring between the components and the fascia 18. The cooling module 50 can then be mounted to the radiator support structure 48 and all other internal components (e.g., wiring, etc.) can be secured in place.

It is to be understood that FIG. 9 is simply a sectional view and other components will be positioned rearwardly of the fascia 18 before moving the support structure 48 into place. Specifically, it is contemplated that the bumper beam 32 will be positioned rearwardly of the fascia 18 and the fascia support brackets 36, 38 will be secured to the fascia 18 with the bumper beam 32 loosely captured as described above.

Figure 11:
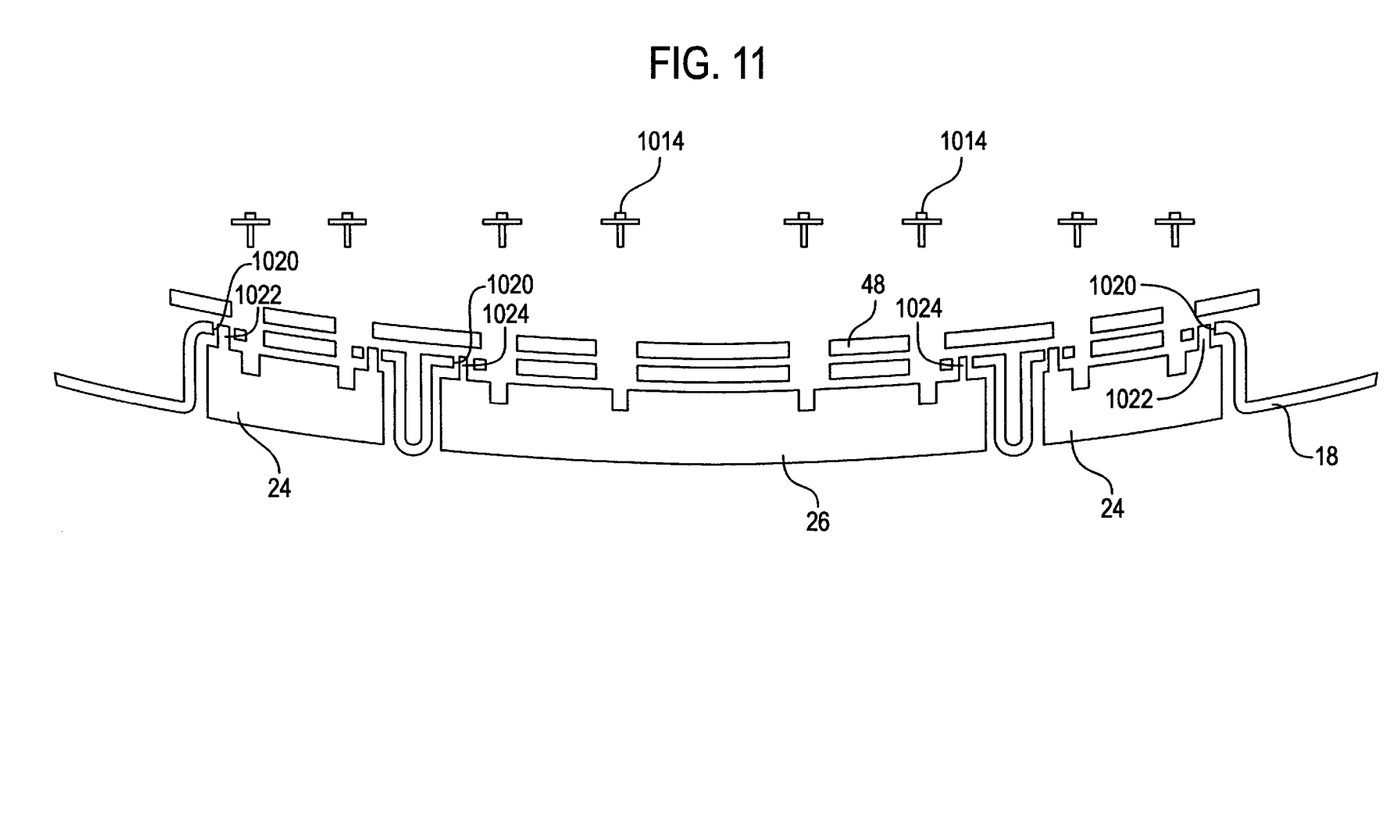
FIG. 11 is a sectional view with the assembly positioned in an assembling fixture taken along lines 11—11 of FIG. 10 and through the fixture.

In another method of the present invention, the fascia 18 itself functions as the template. FIG. 11 schematically illustrates the assembling of the module assembly 10 according to this second method. In this method position controlling portions of the fascia 18 defined by position controlling openings guide the external visible components into their proper orientations and support the components thereat, thereby allowing the assembly 10 to be installed on the motor vehicle without requiring repositioning of the components. Specifically, the position controlling opening 1020 formed on the fascia 18 receives position controlling features 1022, 1024 on the external components so as to guide the components into proper orientation and support the components thereat. Preferably, the features 1022, 1024 are position controlling guide pins.

In the type of module assembly 10 of FIGS. 1 and 2, the radiator support structure 48 would then be positioned rearwardly of the fascia 18 and both the external components and the fascia 18 would then be fastened to the support structure 48, thereby fixing the components in proper orientation. In the types of module assemblies described below with respect to FIGS. 3–6, the radiator support structure is pre-mounted to the vehicle itself and thus cannot serve as an anchor point for the module assembly. In this type of module assembly—termed a 'non-structural' module assembly—the external components may be secured directly to the fascia 18 in their proper orientations. To effect such direct securement, bolts may be used (as shown in FIGS. 3–6) or a snap fit connection may be formed between the position controlling features 1022, 1024 and the position controlling openings 1020 to fix the components in their proper orientation. Other securement means may optionally be used instead. In addition, the cooling module 50 will also be secured directly to the fascia 18, along with various other components such as wiring and the fascia support brackets, rather than to a radiator support structure 48.

Figure 3:
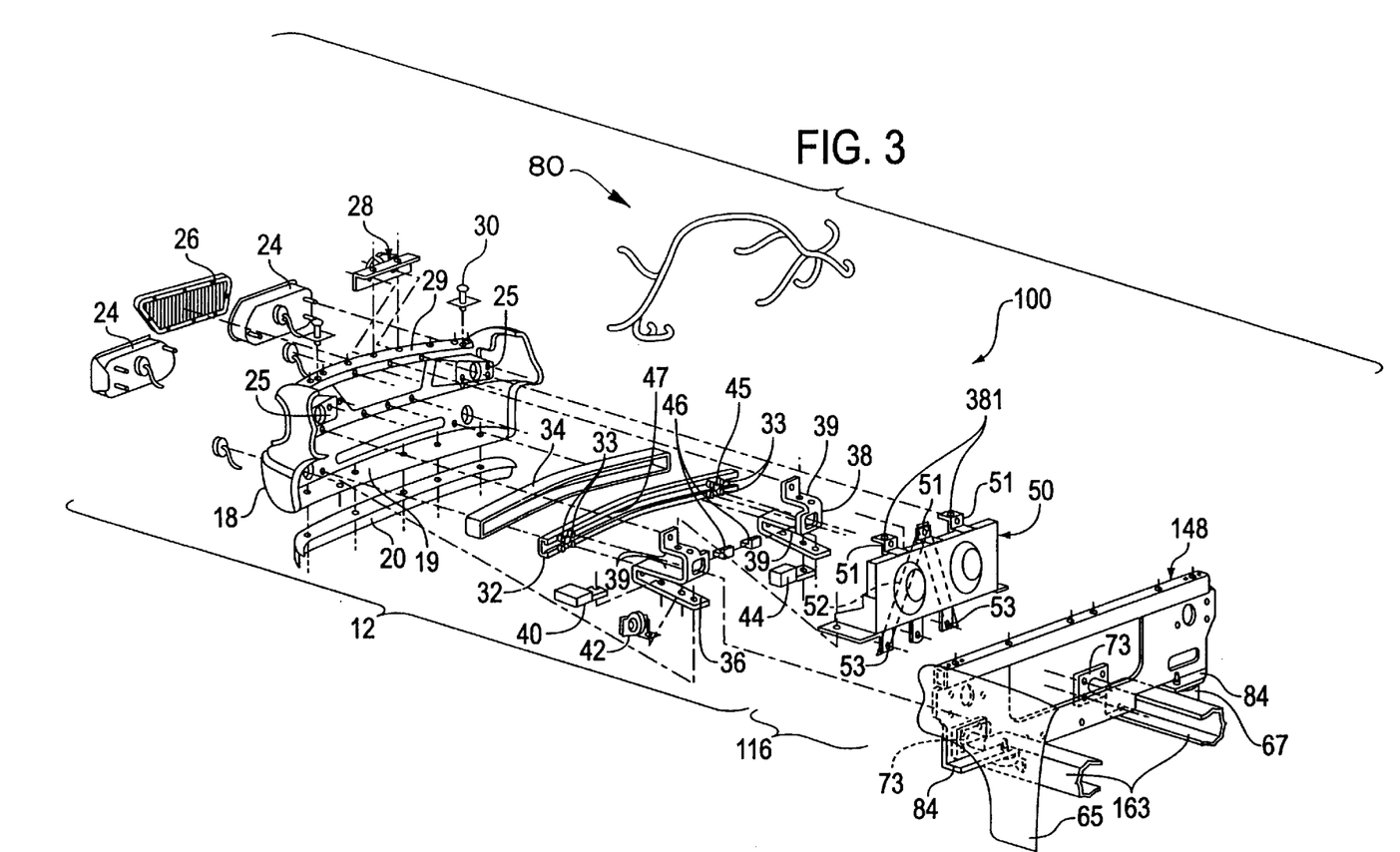
FIG. 3 is an exploded view of a front end module assembly for a framed vehicle without an integral radiator support structure in accordance with a second embodiment of the present invention.
Figure 4:
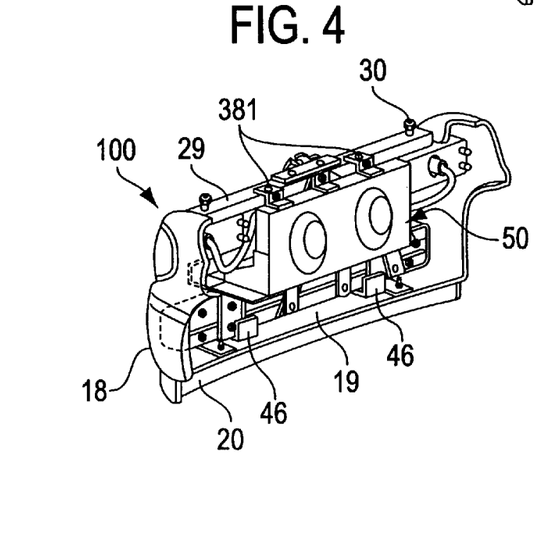
FIG. 4 is a perspective view of the embodiment shown in FIG. 3.

FIGS. 3 and 4 show a front end module assembly 100 for a framed vehicle constructed in accordance with a second embodiment of the invention. The embodiment shown in FIGS. 3 and 4 is similar in all respects to the embodiment shown in FIGS. 1 and 2 except for the following variations. Similar or corresponding parts are designated with the same reference numerals in the figures.

The main difference in the module assembly 100 depicted in FIGS. 3 and 4 is that its does not include an integral radiator support structure. Rather, the radiator support structure 148 in this embodiment forms part of the vehicle or "body-in-white" to which the module 100 is mounted. Thus, radiator support structure 148 does not form part of the rear group 116, which only comprises cooling module 50.

In this embodiment, the radiator support structure 148 is mounted on the isolator mounts 67 on the front of the body in white frame structure 163 in the body shop as opposed to being bolted onto the front body as part of the module assembly, as in the previous embodiment. Thus, the step of mounting the fascia 18 and the external components is omitted in the method of assembly. In addition, the radiator support structure 148 has been slightly modified, such as being provided with two enlarged flanges 84 at its lower edge, thus replacing flange 59 and fender mounts 54 of the first embodiment. The flanges 84 are mounted on top of and fixed to the isolator mounting structures 67.

Also in the embodiment of FIGS. 3 and 4, a pair of assembly aid structures or spacers 46 cooperate with associated brackets 36 and 38. The assembly aid structures 46 are received within the brackets 36, 38 to facilitate assembly of the bumper beam to the front end of a vehicle frame. More particularly, each of the assembly aids 46 are mounted between the upper and middle legs 39 of an associated one of the brackets 36 or 38 and are received within the rearwardly facing longitudinal opening 47 in the rearward end of bumper beam 32 so as to support the bumper beam 32 in vertically spaced relation between upper and middle legs 39 of the brackets 36 and 38 within the pre-assembled module 10. The spacers 46 position the bumper beam 32 in its proper relative orientation with respect to fascia 18, and other parts of the module assembly 100, as will be achieved in the final assembly after bumper beam 32 is fixed to front rail brackets 73. After assembly of the bumper beam 32 to brackets 73 at the front end of the body-in-white, the assembly aids 46 are removed and then discarded or reused. It should be noted, however, that the use of these aids 46 will be obviated by the loading fixture described hereinbelow.

Figure 5:
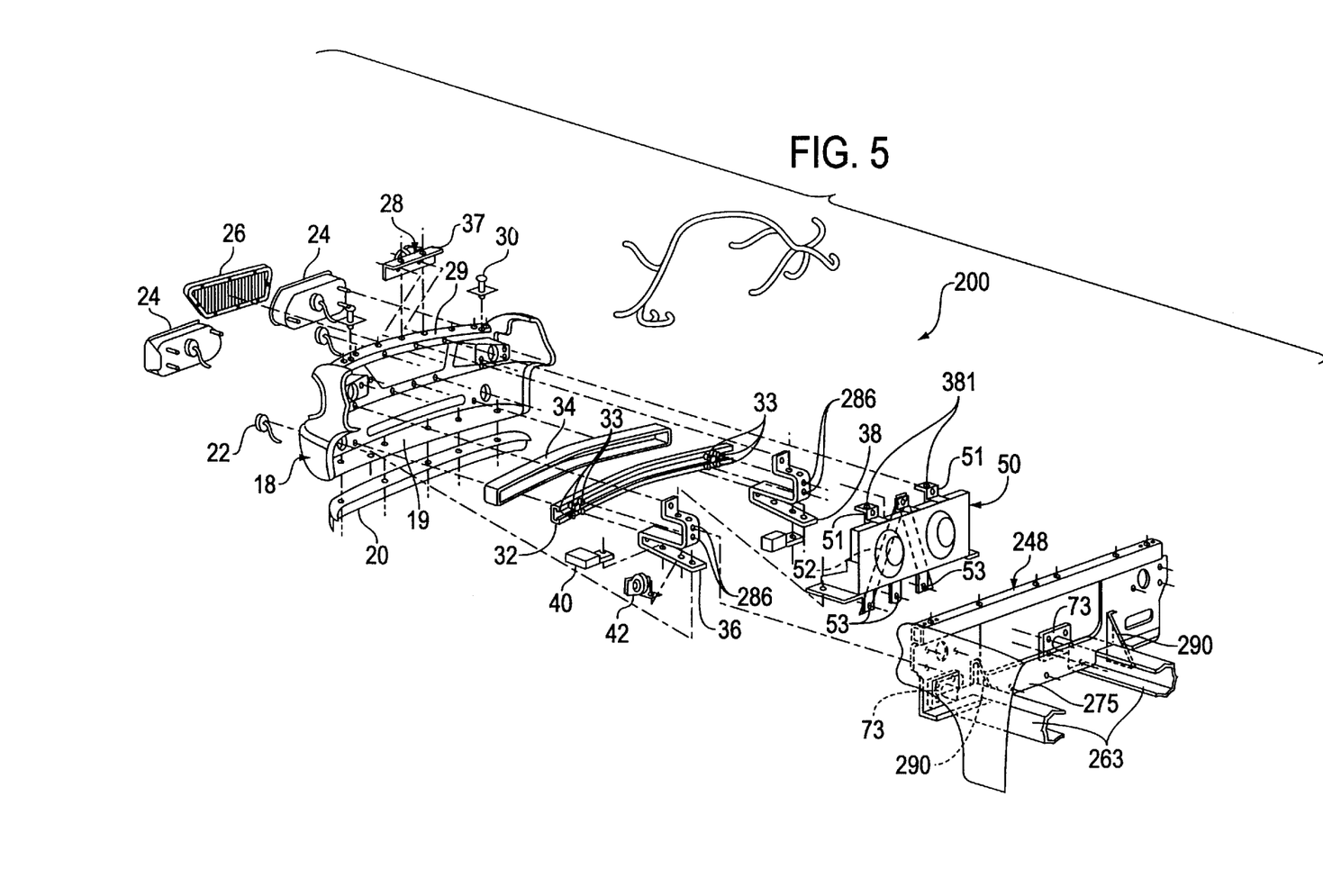
FIG. 5 is an exploded view of a front end module assembly for a unibody vehicle in accordance with a third embodiment of the present invention.
Figure 6:
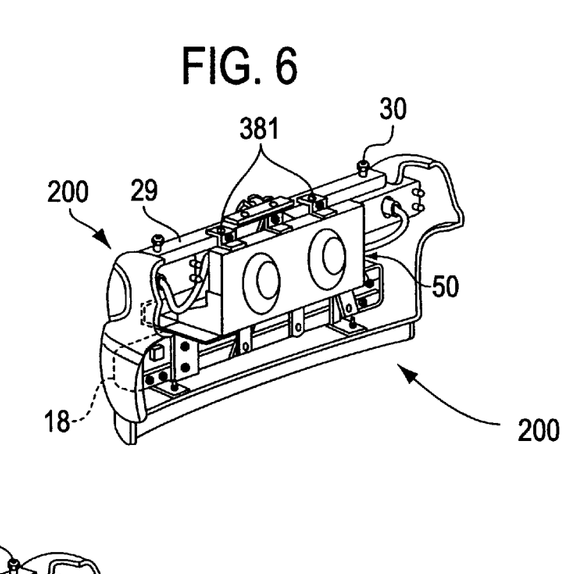
FIG. 6 is a perspective view of the embodiment shown in FIG. 5.

The front end module assembly 200 of FIGS. 5 and 6 is similar to the module illustrated in FIGS. 3 and 4 except that it is adapted for a unibody vehicle. In this embodiment, no assembly aids are provided, and the bumper beam 32 is directly attached to the fascia support brackets 36, 38 because there is no relative movement between bumper beam 32 and the body (or any other relative movement between body/frame components) in a unibody design. Thus, isolator mounts are also omitted from the vehicle and the radiator support is rigidly welded to frame 263. In addition, the fascia support brackets 36, 38 are modified such that each of the large central openings 35 are replaced by two small openings 286 for receiving the bolts that are used to fix the nuts 33 of bumper beam 32 to the brackets 36, 38 and also to the front rail brackets 73. As with the embodiment of FIGS. 3 and 4, the radiator support structure 248 in FIGS. 5 and 6 are not part of the module assembly 200. The method of mounting the radiator support structure 248 to the vehicle frame 263 is by welding it to the front end of the vehicle frame. In addition, rib members 290 are welded to the rear surface of radiator support structure 248. The rib members 290 are in turn welded to the frame 263.

After the radiator support structure 248 is welded to the frame 263, the front end module assembly 200 is secured to the frame 263 and radiator support structure 248. In particular, the tabs 53 of cooling module 50 are fastened to the lower panel 275 of radiator support structure 248, and the nuts 33 are secured to the front rail brackets 73 mounted to the frame 263. Portions of the fascia 18 are also mounted to portions of the radiator support structure 248, and the latch flange 37 is fastened to the upper surface of the upper portion 29 of the fascia 18.

It is to be understood that any of the above embodiments may be used in conjunction with the subject matter in U.S. Provisional Application of Longo et al., Serial No. 60/092, 955, the entirety of which is hereby incorporated into the present application by reference.

Figure 7:
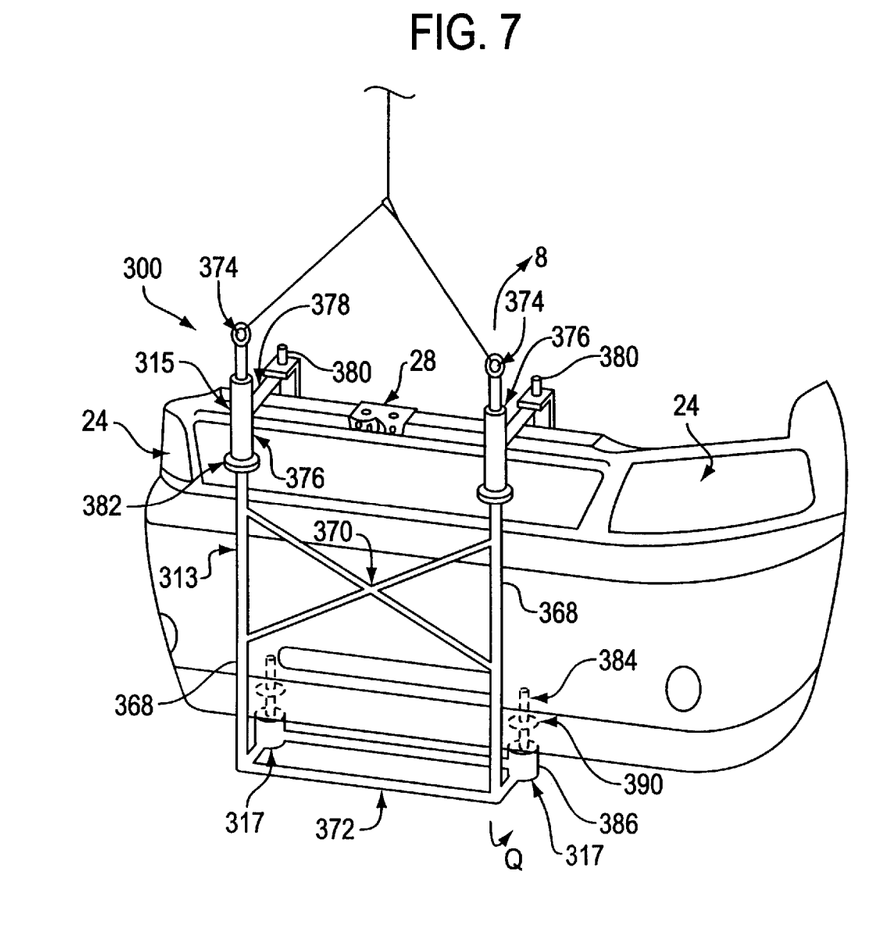
FIG. 7 is a perspective view of a front end module loading fixture, disposed in operating relation with a front end module assembly embodying the principles of the present invention.
Figure 8:
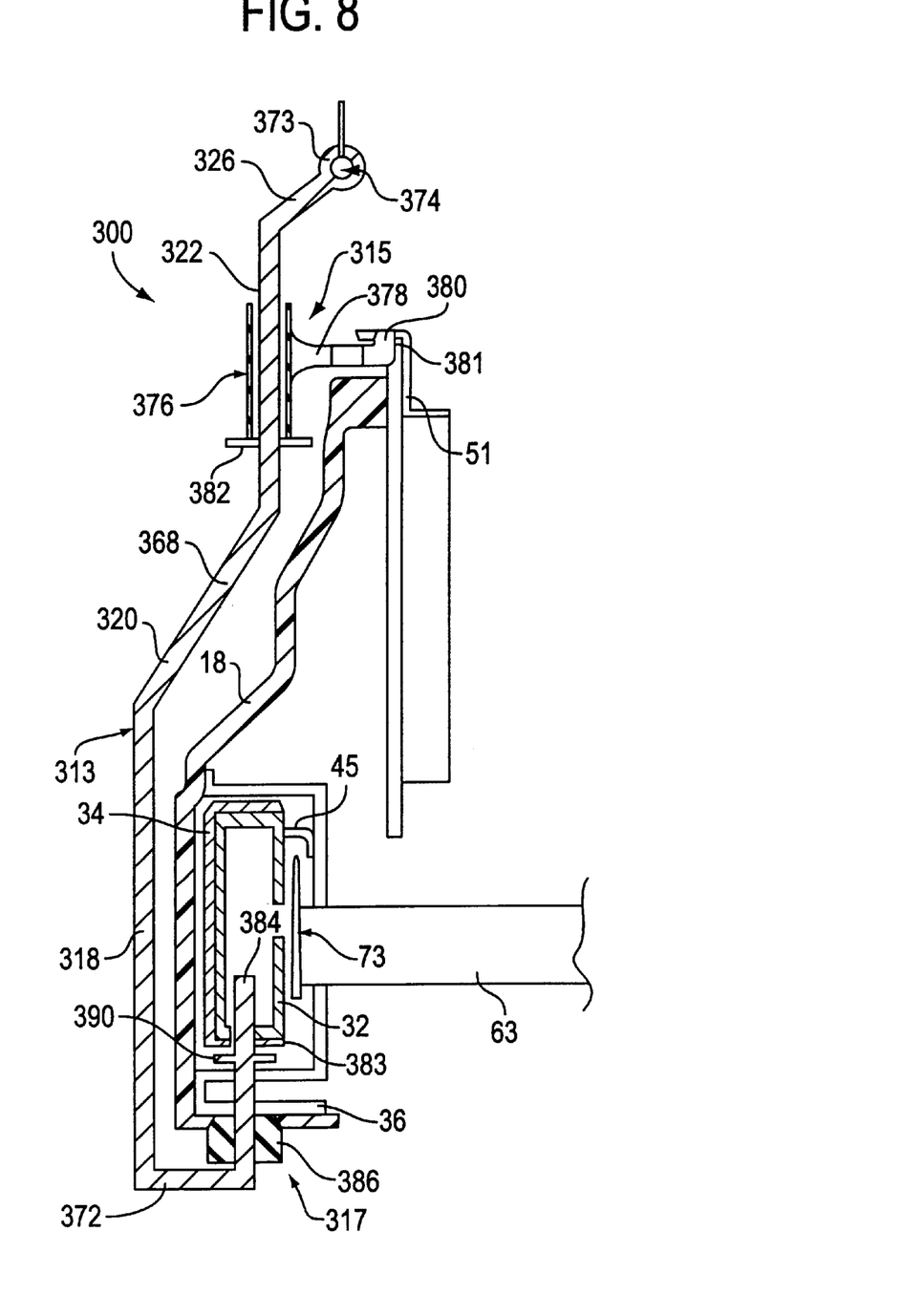
FIG. 8 is an enlarged sectional view taken along the line 8—8 in FIG. 7.

Referring now more particularly to FIGS. 7 and 8, a preferred front end module loading fixture 300 is shown. The fixture 300 facilitates handling of a front end module 10, 100, or 200 in accordance with the present invention. The front end module loading fixture 300 is comprised of three assemblies: a main supporting frame, generally depicted at 313, a first lifting fixture in the form of a pair of upper lifting fixtures, generally depicted at 315, and a second lifting fixture in the form of a pair of lower lifting fixtures, generally depicted at 317. The main support frame 313 includes a pair of laterally spaced, vertically extending parallel upright members 368. As shown in FIG. 8, the parallel members 368 have a lower portion 318 generally extending straight upwards, a middle portion 320 which angles rearwardly and upwardly from the lower portion 318, and an upper portion 322 which extends straight upwards from the upper end of middle portion 320. The uppermost portion 326 of each parallel member 368 extends upwardly and rearwardly and has a mounting ring structure 373 having a central opening 374 of compatible size and configuration with the attaching members of a conventional hoisting device. The parallel upright members 368 are secured and supported in parallel, vertical disposition by an X-shaped cross-member 370.

A rectangular lower frame structure 372 provides the base support for the fixture 300 and rests on an assembly support surface or floor. The bottom ends of the parallel members 368 are fixed or integrally formed with the front corners of the lower frame structure 372.

The upper lifting fixtures 315 each basically comprise a vertically elongated sleeve-like portion 376 and a lifting structure in the form of a telescoping and rotating lift finger 378. The sleeve-like portions 376 are disposed in surrounding relation to the upper portions 322 of the respective upright members 368 and allow the upper lifting fixtures 315 to slide along and rotate around the parallel upright members 368. Each rotating/telescoping lift finger 378 protrudes horizontally and rearwardly from a sleeve portion 376 of an associated upper lifting fixtures 315. Near the distal end of each lifting finger 378 is a relatively short knob-like protrusion 380 which projects upwards and is configured to be received within the openings 381 in the tabs 51 at the upper part of the front end module 10, 100, or 200. A disk-like finger stop 382 is adjustably fixed at a desired vertical position on upper portion 322 of each parallel member 368 below the sleeve portion 376 to serve as a lower stop for the sleeve 376 of the upper lifting fixture 315.

The lower lifting fixture 317 includes a lower lifting structure in the form of a vertical post or pick-up finger 384 fixedly secured to or integrally formed with the rearward corners of the lower frame structure 372 of the support frame 313. The pick-up fingers 384 are of such height and diameter penetrate holes 383 in the lower surface of the bumper beam 32. An up/down stop disk 390 is integrally formed or fixed at an intermediate portion of each of the pick-up fingers 384 and provides a lower support surface for the bumper beam 32 when the module 10, 100, or 200 is lifted. Fixedly secured in surrounding relation to the base of the pick-up finger 384, beneath stop disk 390, is a rubber stop/guide 386 which fits into a hole in the bottom surface of the fascia 18. This rubber guide 386 does not support any substantial vertical weight, but is used to prevent the lower portions of the front end module 10 from tipping forward when the module 10 is lifted by the telescoping/rotating lift fingers 378.

Use of the front end module loading fixture 300 in accordance with principles of the invention entails positioning the loading fixture 300 in front of the front end module 10, 100, or 200 such that the pick-up fingers 384 are somewhat lower than the bottom of the fascia 18, the fascia being supported from below by a shipping skid or crate. The loading fixture 300 is moved toward the front end module 10, 100, or 200 until the pick-up fingers 384 are beneath the lift finger holes 383 in bumper beam 32. The fixture 300 is then lifted as needed to insert the pick-up fingers 384 into lift finger holes 383. The height of lift finger stop members 382 is adjusted such that the upper lifting fixtures 315 along the parallel members 368 of the loading fixture aligns the rotating/telescoping lifting fingers 378 so that they are approximately at the same height or slightly below the forwardly extending portions of the outer tabs 51 with openings 381. The telescoping lifting fingers 378 are then extended and/or rotated so that upward projections 380 are immediately below the openings 381. The fixture 300 is then hoisted so that projections 380 are received within the openings 381 and so that the entire module is lifted via lifting fingers 378 and moved to an installation position with respect to the vehicle. The bumper beam 32 is independently lifted by stops 390 below lift fingers 384.

The stops 390 lift the bumper beam 32 to a bumper installation position a determined distance higher than the nominal design position at which the beam is fixed to the frame brackets 73 in order to allow the beam catch 45 to clear the top of the front frame brackets 73 upon rearward loading of the module. After the module 10, 100, 200 is secured to the vehicle (e.g., by fixing radiator support 48 to fenders 65 or body in the first embodiment; or by fixing the fascia 18 and/or cooling module 50 to the fenders 65, radiator support 148, or other body components in the second embodiment), the fixture 300 is lowered to hook the beam catch 45 on the frame brackets 73. The bumper beam 32 is now in the design position and temporarily held until assembly bolts are used at the next high level assembly line station to fix the bumper beam 32 to the brackets 73 at nuts 33.

The loading fixture 300 thus allows the front end module 10, 100, or 200 to be lifted and supported to facilitate mounting thereof on the forward end of a vehicle frame assembly.

It will be thus seen that the object of the present invention has been achieved by the foregoing embodiments. The embodiments described herein, however, are provided to illustrate the functional and structural principles of the present invention and are not intended to be limiting. In contrast, the present invention is intended to encompass all modifications and alterations within the scope of the appended claims.

Any U.S. patents or patent applications mentioned hereinabove and not explicitly incorporated are now hereby incorporated into the present application by reference.

It should be noted that the appended claims do not contain limitations or elements expressed in the 'means for performing a specified function' format of 35 U.S.C. §112, paragraph 6. This is to clearly point out that the applicant does not intend the claims to be interpreted under 35 U.S.C. §112, paragraph 6, so as to be limited solely to the structures disclosed in the present specification and their structural equivalents.

What is claimed:

1. A method for assembling an end module assembly for installation on a motor vehicle, said method comprising:
   providing an exterior fascia configured to comprise a portion of a vehicle body when said assembly is subsequently installed on the motor vehicle;
   providing an external visible component configured to be positioned in a predetermined orientation with respect to said fascia with a surface of said external component facing exteriorly of said fascia;
   providing an external assembling fixture having supporting surfaces positioned and configured to engage said exteriorly facing surface of said external component and exteriorly facing surfaces of said fascia so as to support said external component in said predetermined orientation with respect to said fascia;
   positioning said external component and said fascia in said external assembling fixture such that said supporting surfaces engage said exteriorly facing surface of said external component and said exteriorly facing surfaces of said fascia so as to support said external component in said predetermined orientation with respect to said fascia; and while said external component and said fascia are positioned in said assembling fixture, securing said external component and said fascia in a fixed relation to one another so as to fix said external component in said predetermined orientation with respect to said fascia, thereby allowing said assembly to be installed on the vehicle without requiring reorientation of said external component.

2. The method of claim 1, further comprising positioning an assembly integrating structure rearwardly of said external component and said fascia while said component and said fascia are positioned in said assembling fixture, wherein said securing step comprises mounting said fascia and said external component to said integrating structure so as to fix said external component in said predetermined orientation.

3. The method of claim 2, wherein said mounting step comprises inserting fasteners through openings formed through said integrating structure and fastening said external component and said fascia to said integrating structure with said fasteners.

4. The method of claim 3, wherein said openings formed through said integrating structure are oversized with respect to said fasteners to thereby accommodate manufacturing tolerances in said fascia and said external component.

5. The method of claim 4, wherein said assembling fixture is a mold having a concave recess for receiving said fascia and said external visible component, said recess providing said fixed surfaces.

6. The method of claim 5, wherein said integrating structure is a cooling module support structure and said method further comprises the step of mounting a cooling module to said cooling module support structure.

7. The method of claim 6, wherein said cooling module comprises a radiator, a condenser, a transmission oil cooler, and a fan shroud.

8. The method of claim 6, wherein said external component comprises a pair of headlamps and said fascia includes a pair of laterally spaced, forwardly facing openings positioned and configured to receive said headlamps in predetermined orientations as aforesaid.

9. The method of claim 8, wherein said external component further comprises a grill and said fascia includes a central, forwardly facing opening positioned and configured to receive said grill in a predetermined orientation as aforesaid.

10. The method of claim 8, wherein said external component further comprises a pair of auxiliary lamps and said fascia includes a second pair of laterally spaced, forwardly facing openings positioned and configured to receive said auxiliary lamps in predetermined orientations as aforesaid.

11. The method of claim 2, further comprising the steps of:

positioning a bumper beam supporting structure rearwardly of said fascia;

mounting said bumper beam supporting structure in fixed relation to said fascia;

positioning a bumper beam rearwardly of said fascia such that said bumper beam supporting structure supports said bumper beam.

12. The method of claim 11, wherein relative movement is permitted between a frame and the body of the vehicle and said bumper beam supporting structure loosely supports said bumper beam such that, when said module assembly is installed on the vehicle, said bumper beam can be subsequently mounted to the vehicle frame and move along with the frame relative to the vehicle body.

13. The method of claim 12, further comprising the step of:

positioning bumper beam assembly aids on said bumper beam supporting structure, said bumper beam assembly aids being positioned and configured to support said bumper beam so that, when said module assembly is subsequently installed on the vehicle, said bumper beam can be mounted to the vehicle frame without vertically repositioning the bumper beam and then the aids can be subsequently removed from the vehicle.

14. The method of claim 12, wherein said bumper beam supporting structures are fascia support brackets.

15. The method of claim 11, wherein the vehicle is a unibody vehicle with no relative movement permitted between a vehicle frame and the vehicle body and said steps of positioning said bumper beam and positioning said bumper beam supporting structure comprises fixedly securing said bumper beam to said bumper beam supporting structure so that, when said module assembly is subsequently installed on the vehicle, said bumper beam can be mounted to the vehicle frame without vertical repositioning.

16. The method of claim 15, wherein said bumper beam supporting structures are fascia support brackets.

* * * * *